United States Patent
Solomon et al.

(10) Patent No.: US 10,533,773 B2
(45) Date of Patent: Jan. 14, 2020

(54) SOLAR THERMAL HEAT EXCHANGER

(71) Applicants: Gary Michael Solomon, San Diego, CA (US); William Emmett Ryan, IV, Stillwater, OK (US); Travis Tyler Brady, Austin, TX (US); Nizam Najd, Stillwater, OK (US)

(72) Inventors: Gary Michael Solomon, San Diego, CA (US); William Emmett Ryan, IV, Stillwater, OK (US); Travis Tyler Brady, Austin, TX (US); Nizam Najd, Stillwater, OK (US)

( * ) Notice: Subject to any disclaimer, the term of this patent is extended or adjusted under 35 U.S.C. 154(b) by 10 days.

(21) Appl. No.: 14/958,749

(22) Filed: Dec. 3, 2015

(65) Prior Publication Data
US 2016/0161152 A1    Jun. 9, 2016

Related U.S. Application Data

(60) Provisional application No. 62/087,153, filed on Dec. 3, 2014.

(51) Int. Cl.
*F24S 10/70*    (2018.01)

(52) U.S. Cl.
CPC ................. *F24S 10/70* (2018.05)

(58) Field of Classification Search
CPC ........... F24D 17/0036; F24J 2/20; F24S 10/70
USPC ....................................... 126/643
See application file for complete search history.

(56) References Cited

U.S. PATENT DOCUMENTS

| | | | | |
|---|---|---|---|---|
| 4,030,477 A | * | 6/1977 | Smith | F24S 23/75 126/695 |
| 4,212,293 A | * | 7/1980 | Nugent | F24S 10/45 126/711 |
| 2009/0020110 A1 | * | 1/2009 | Lauritzen | F24D 17/0021 126/590 |
| 2012/0073567 A1 | * | 3/2012 | Winston | B21D 53/02 126/652 |
| 2012/0291433 A1 | * | 11/2012 | Meng | F01K 25/08 60/641.15 |
| 2013/0247901 A1 | * | 9/2013 | Mader | F24J 2/201 126/711 |

* cited by examiner

*Primary Examiner* — Avinash A Savani
*Assistant Examiner* — Aaron H Heyamoto
(74) *Attorney, Agent, or Firm* — Martin S. High, P.C.

(57) ABSTRACT

The described embodiments provide thermal energy via solar powered heat exchangers. This energy can be implemented to heat hot water or heat residential/commercial structures. Parallel mounted vacuum insulated tubes heat water within a geometric heat transfer piping system. This thermal energy is transferred via a piping system to an insulated tank. A digital controller monitors and controls the temperature of the water within the system as well as provides frost/freezing protection. An electrical active pumping system is connected to the digital controller to circulate water within the solar heat exchanger. The electric active pump can be connected to a solar photovoltaic (electric) panel for reliable and uninterrupted heat/hot water delivery.

3 Claims, 12 Drawing Sheets

SOLAR THERMAL HEAT EXCHANGER

CROSS-REFERENCE TO RELATED APPLICATIONS

This application claims priority of U.S. Provisional Application No. 62/087,153 filed on Dec. 3, 2014. U.S. Provisional Application No. 62/087,153 is hereby incorporated in this application by reference.

STATEMENT REGARDING FEDERALLY SPONSORED RESEARCH OR DEVELOPMENT

Not applicable

FIELD OF THE EMBODIMENTS

The described embodiments pertain to the energy production. More specifically, the described embodiment pertains to the solar thermal heat exchangers.

BACKGROUND OF THE EMBODIMENTS

The described embodiments are based upon the design of a solar thermal heat exchanger. There is a clear need in the marketplace for this type of clean energy technology to create thermal heat and hot water. Overall, this technology uses solar energy to generate hot water, and with additional modifications and adjustments, this technology can also pump and treat potable water, aid in processing waste, and even generate electricity. Current designs implementing solar thermal hot water systems are ineffective in many climates. They are also limited by the cost and the size of the product and by the configuration, alignment, and scope of the system's design. The overall aim of the embodiments described herein are to improve heating efficiency and overall effectiveness from an economy-of-scale perspective. Furthermore, since the embodiments aim to reach the objective of improved heating efficiencies.

SUMMARY OF THE EMBODIMENTS

The embodiments of the solar collector comprise vacuum insulated, parallel cylindrical and transparent glass tubes or flat plate collectors. Sunlight enters the tube or flat plate collector, strikes the internal absorber and heats a geometrically designed metallic tubes or heat fins with liquid flowing through the pipe. The solar radiant energy is absorbed metallic tubes or heat fins and is converted to internal energy of the tube or fins raising the temperature of the tube or fins. This heating of the tubes and fins creates the temperature gradient required to produce heat transfer to the liquid inside of the tube or fins.

There are three fundamental designs. The three designs include 1) a wet tube vacuum heat transfer variation, 2) a dry tube vacuum heat transfer variation, and 3) a flat plate heat collector. The three designs vary in heat transfer principle, but share a common function in an overall heat transfer system. More specifically, the three fundamental designs are interchangeable in the overall heat transfer system. The solar collecting manifold is designed to mate to the heat transfer tubes or heat fin system within the system. A solar heat transfer controller is then used with our specific programming to regulate temperature in the system. A solar photovoltaic (electric) panel 114 integrates to the solar heat transfer controller and the active pump.

There is a clear need in the marketplace for this type of clean energy technology to heat water. Overall, this technology uses solar energy to generate hot water, and with additional modifications and adjustments, this technology can also pump and treat potable water and process waste and even generate electricity. Current designs implement a solar thermal hot water system that is effective, but they are limited by the cost and the size of the product and by the configuration, alignment, and scope of the system's design. The overall aim of our company focuses on configuring, aligning, and developing elements of the new solar thermal systems designed to improve heating efficiency and overall effectiveness from an economy-of-scale perspective. Furthermore, goal of the instant embodiments is to of improve heating efficiencies for solar thermal collection.

DETAILED DESCRIPTION OF THE PREFERRED EMBODIMENTS

Figure 1:
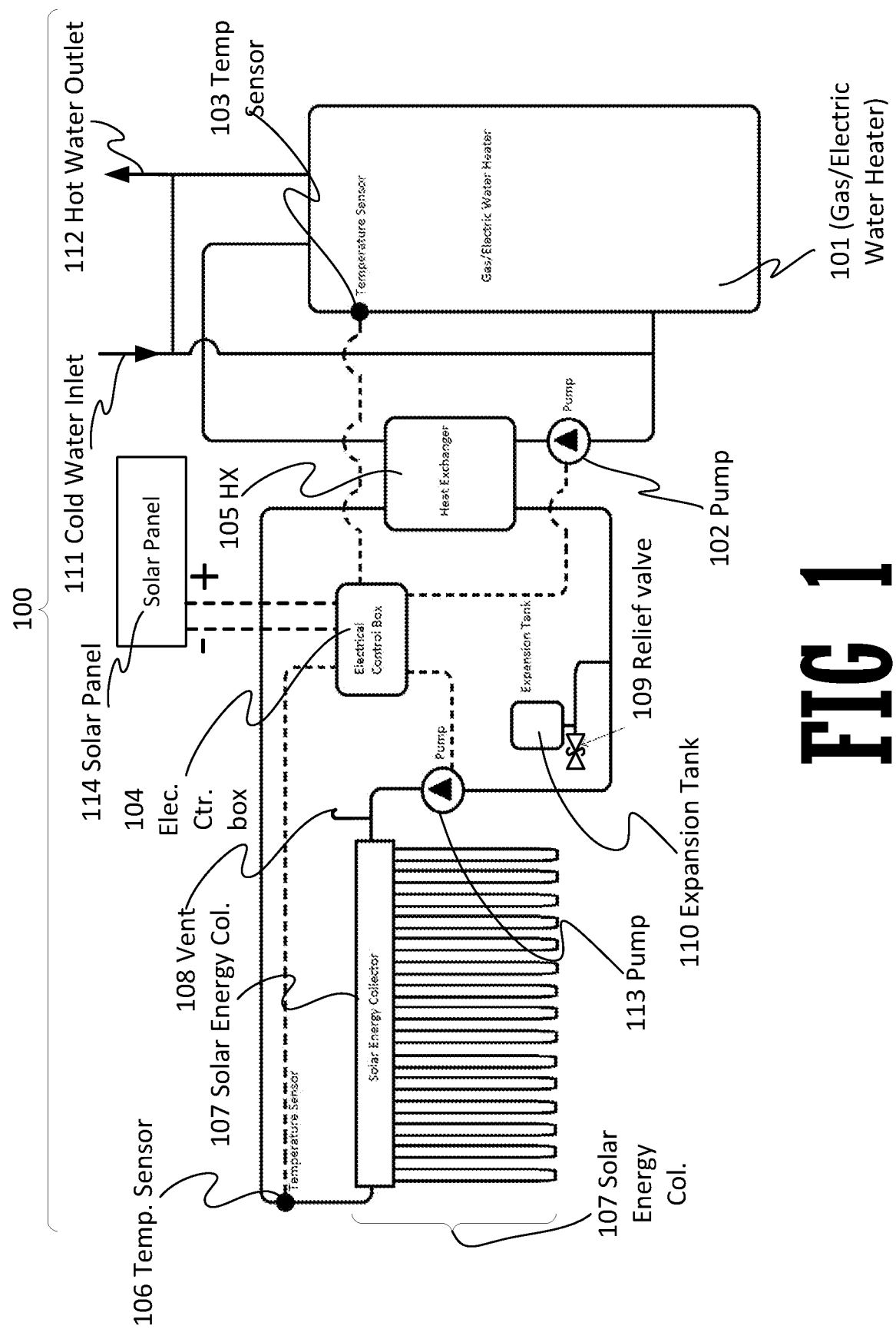
FIG. 1 is a schematic of an embodiment of the Solar Thermal Hot Water Heating Vacuum/Geometric Tube System.

A preferred embodiment of the Solar Thermal Hot Water Heating System 100 comprises geometrically designed pipes mounted within a vacuum insulated and parallel transparent glass tubes 107, a controller 104, a working fluid recirculation pump 113, an expansion tank 110, a vent 108, a relief valve 109, a heat exchanger 105, and a plurality of temperature sensors 106 and 103. One of the temperature sensors 103 is used to monitor the temperature of the domestic water heater 101. See FIG. 1. Water from the water heater 101 is circulated via a pump 102 through the heat exchanger 105 and then returns to the water heater 101. In another embodiment the thermal hot water heating system 101 is also comprised of a solar photovoltaic (electric) panel 114 that allows system 100 to operate without an external power source.

The solar energy collector 107 of the Solar Thermal Hot Water Heating System 100 is an interchangeable component of the system. The solar energy collector 107 is the component of the overall design that collects the solar energy. The solar energy collector 107 can be of any design that captures radiant energy from the sun and converting that energy into the internal energy of the component of the solar energy collector 107. By way of example and depending on the application, the following three configurations can be used as a solar energy collector 107: 1) a wet tube vacuum heat transfer variation, 2) a dry tube vacuum heat transfer variation, or 3) a flat plate heat collector.

A primary loop fluid is circulated through the solar energy collector 107 by a pump 113. The pump 113 forces the fluid into and out of the solar energy collector 107. As the primary fluid exits the solar energy collector 107 the temperature of the primary fluid is measured by a temperature sensor 106. The fluid then travels to the heat exchanger 105 and recirculates to the pump 113. The flow of primary fluid is controlled by a controller 104. The controller 104 takes input from the domestic water supply temperature sensor 103 and the temperature of the outlet of the solar energy collector 107 with the temperature sensor 106. Using this information the controller 104 determines the amount of energy to be supplied to the pump 113 to control the speed of the pump 113 and the overall flow rate of the primary fluid.

The energy collected by the solar energy collector 107 is transferred to the primary fluid in the solar energy collector 107. The heat exchanger 105 transfers energy from the primary fluid to the domestic water supply.

The water supply is stored in a water heater 101. The domestic water supply is circulated between the heat exchanger 105 and the water heater 101 via a pump 102. The water heater 101 is constantly supplied by cold water from the cold water inlet 111. Hot water is supplied via the hot water outlet 112. In another embodiment is comprised of an independent flat plate geometrically designed heat transfer system. Sunlight enters the tubes or the flat plate collectors, strikes the internal absorber and heats a liquid flowing through the tube system or flat plate system.

The embodiments comprise one of three alternate fundamental designs. The three designs comprise 1) a wet tube vacuum heat transfer variation, 2) a dry tube vacuum heat transfer variation, and 3) a flat plate heat collector.

Figure 2:
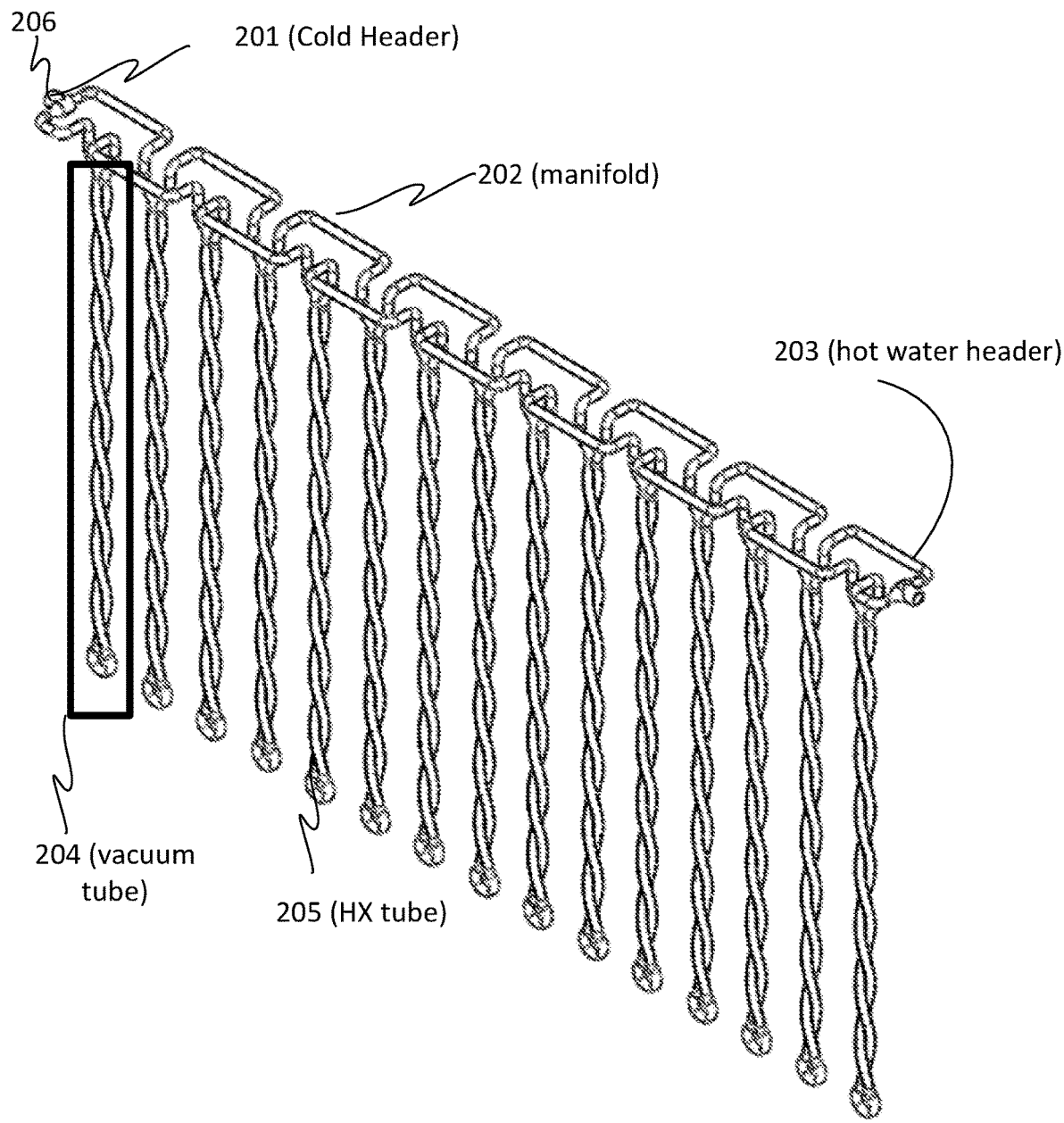
FIG. 2 is a perspective view of an embodiment of the Solar Thermal Hot Water Heating Vacuum/Geometric Tube System
Figure 3:
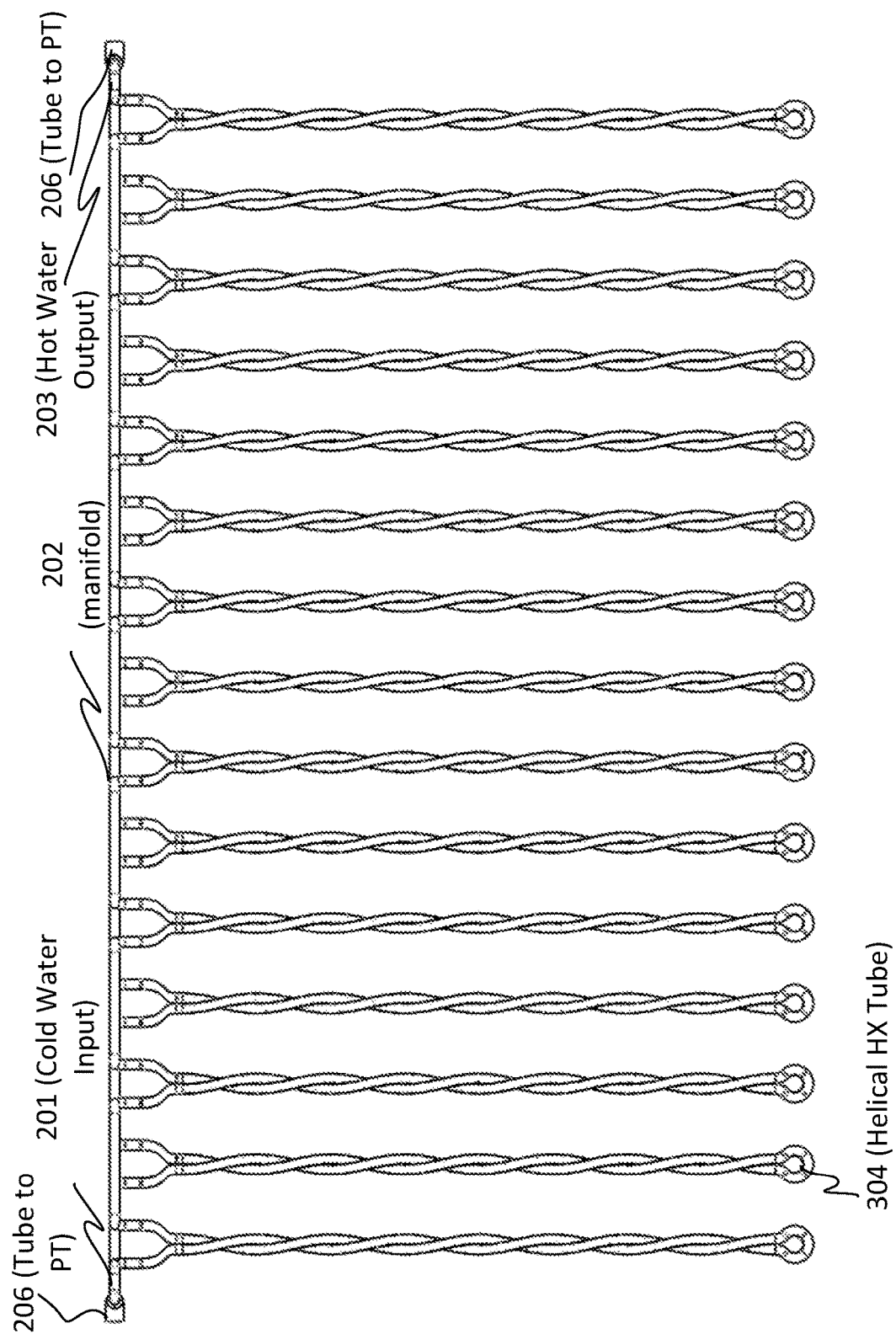
FIG. 3 is a front view of an embodiment of the Solar Thermal Hot Water Heating Vacuum/Geometric Tube System in standard 2-D view.
Figure 4:
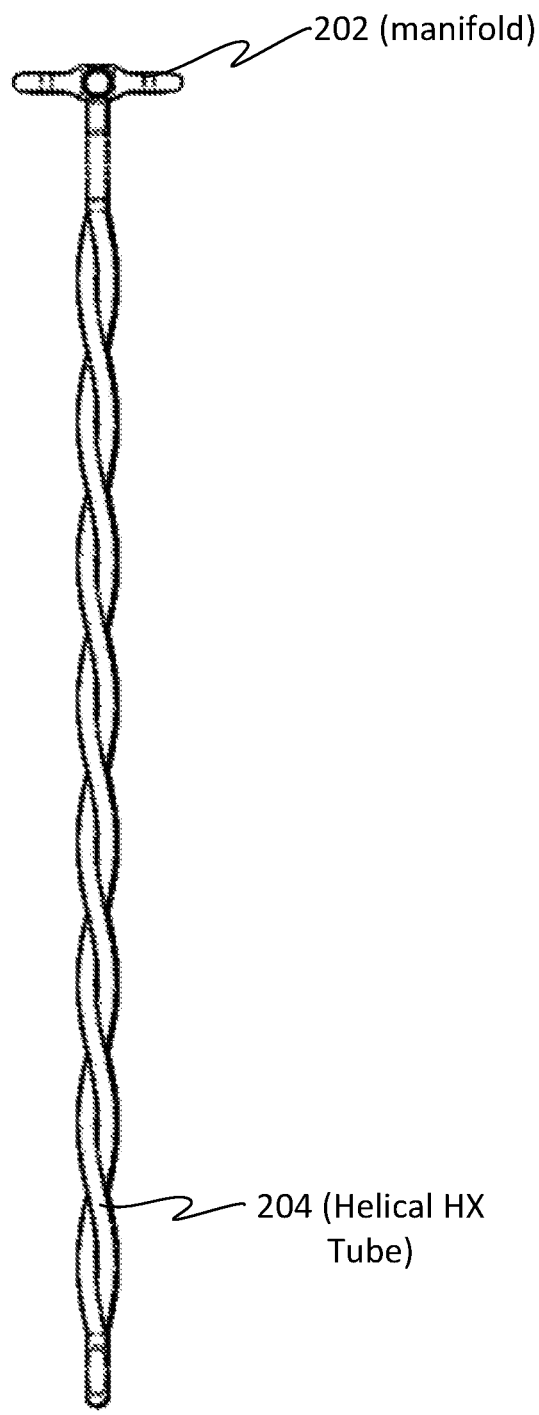
FIG. 4 is a side view of an embodiment of the Solar Thermal Hot Water Heating Vacuum/Geometric Tube System.
Figure 5:
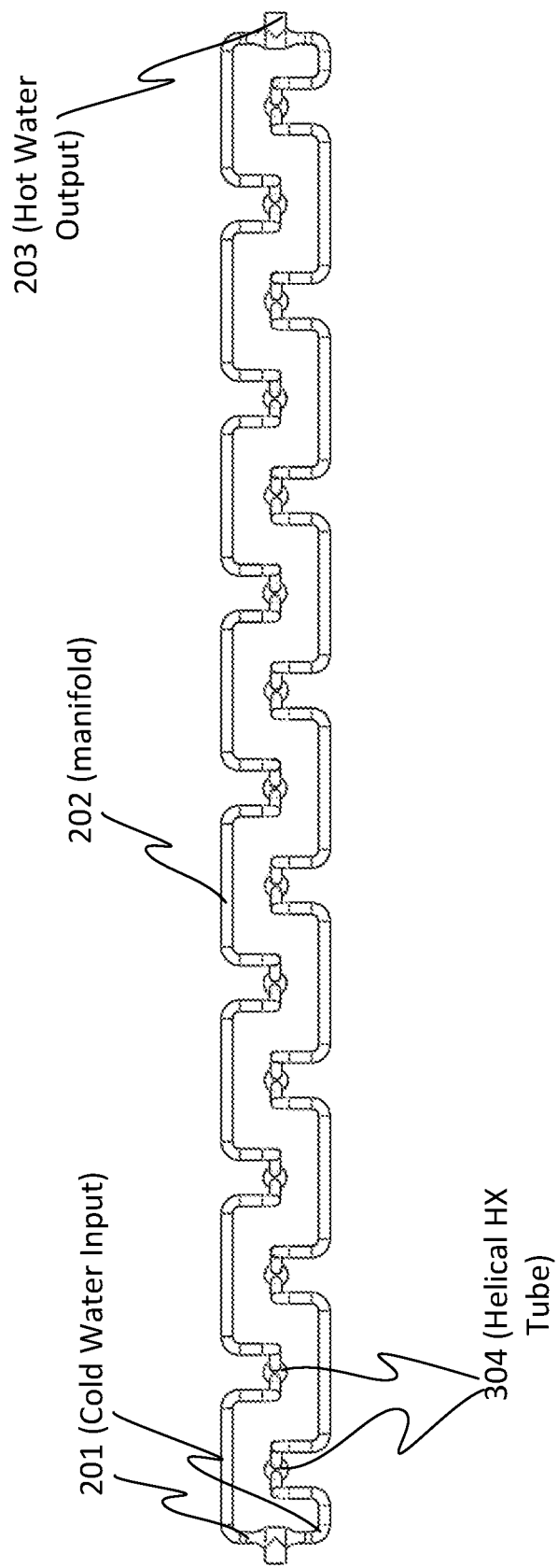
FIG. 5 is a front view of an embodiment of the Solar Thermal Hot Water Heating Vacuum/Geometric Tube System in vertical view.
Figure 6:
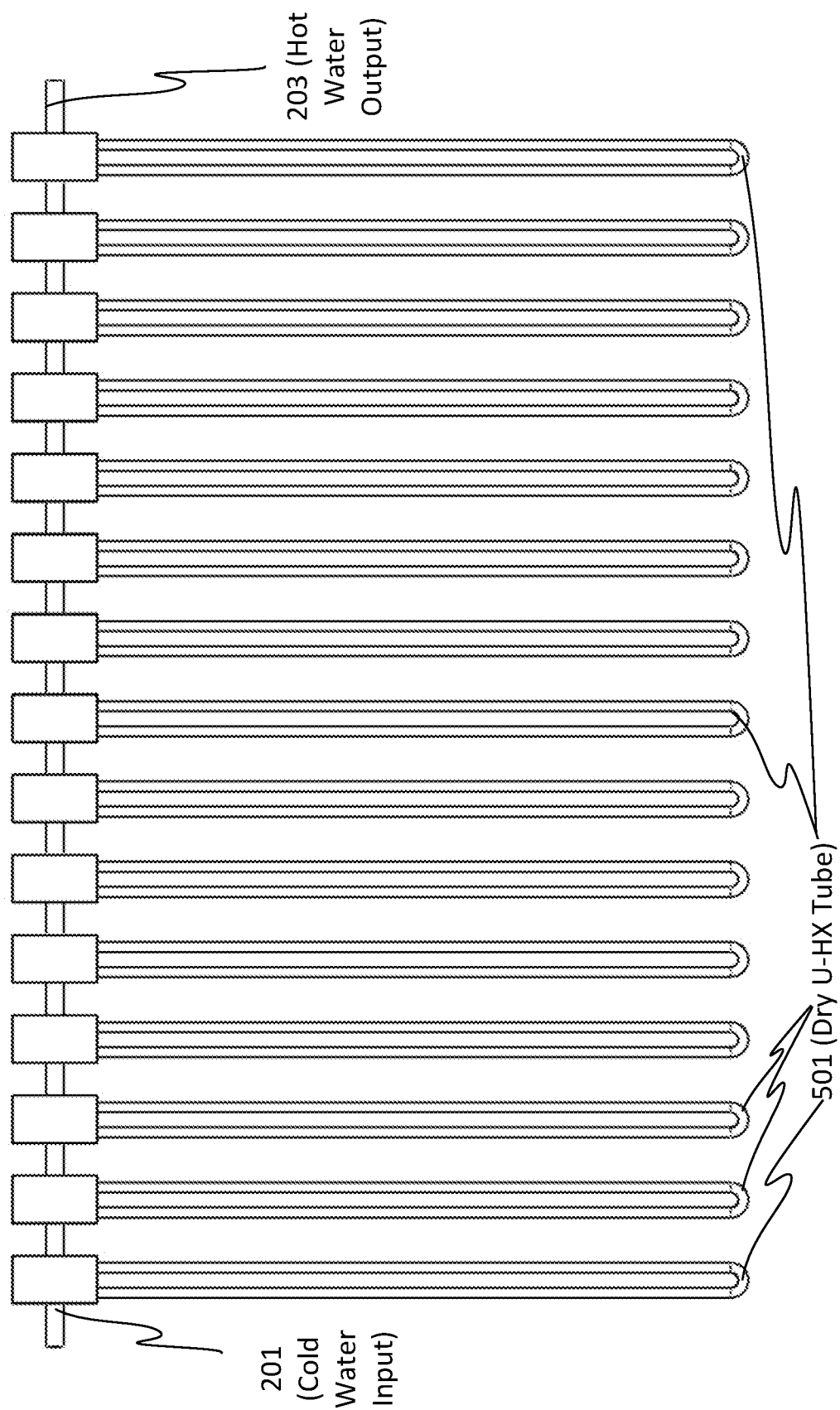
FIG. 6 is a front view of an embodiment of the Wet Solar Thermal Hot Water Heating Vacuum/Geometric Tube System.

The wet tube vacuum system directly uses the circulating water through the system as a means for heat transfer. Water is circuited several times through both the tubes and collector manifold at the top of the tubes. After the water is heated it is then stored in the insulated tank. The wet tube vacuum system is comprised of a cold header 201, a manifold 202, a hot header 203, a plurality of heat exchange tubes 205, and a plurality of vacuum tubes 204. See FIGS. 2 through 5. The plurality of vacuum tubes are represented by a single vacuum to in FIG. 2 for clarity.

Figure 7:
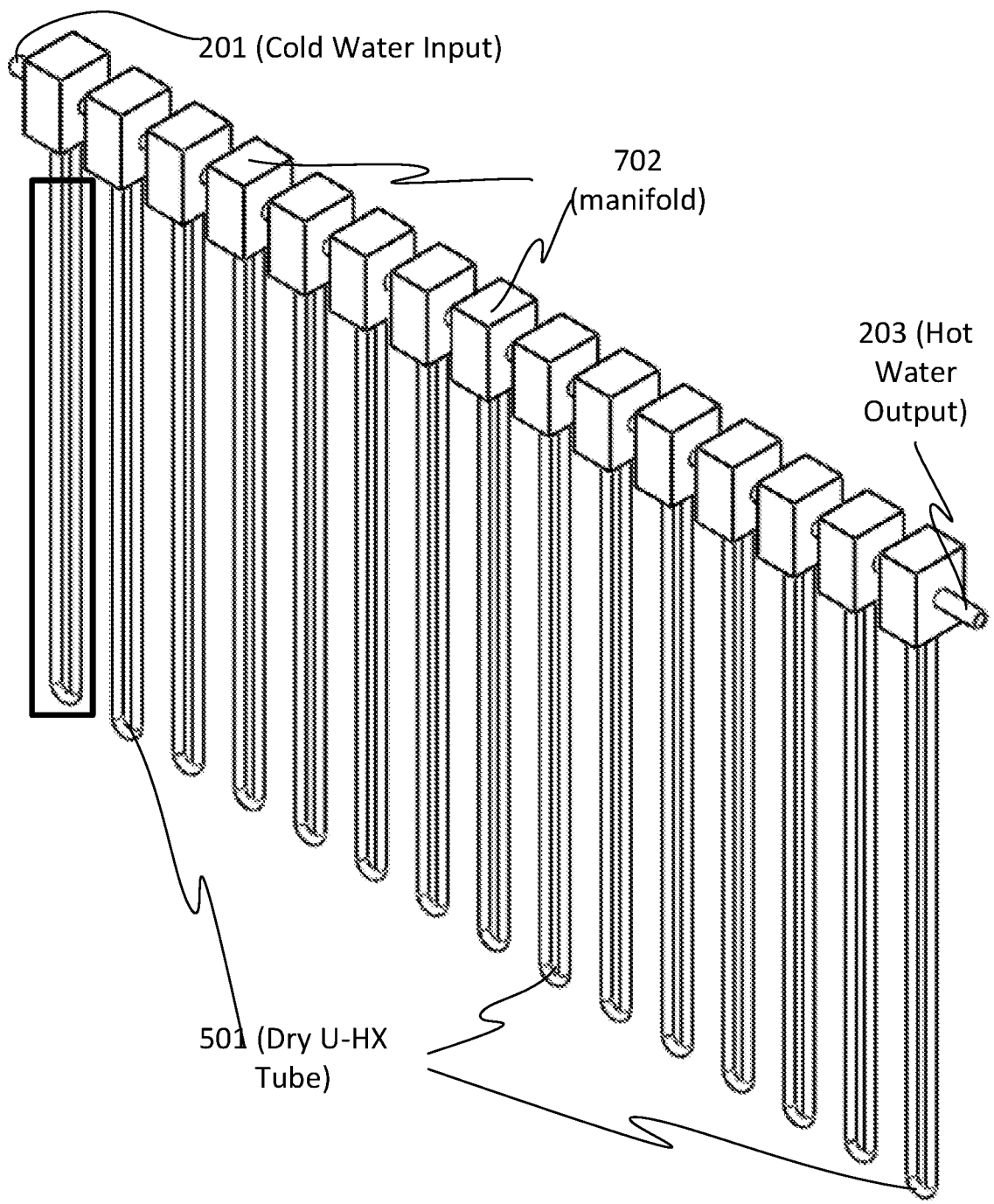
FIG. 7 is a perspective view of an embodiment of the Dry Solar Thermal Hot Water Heating Vacuum/Geometric Tube System in 3-D view.
Figure 8:
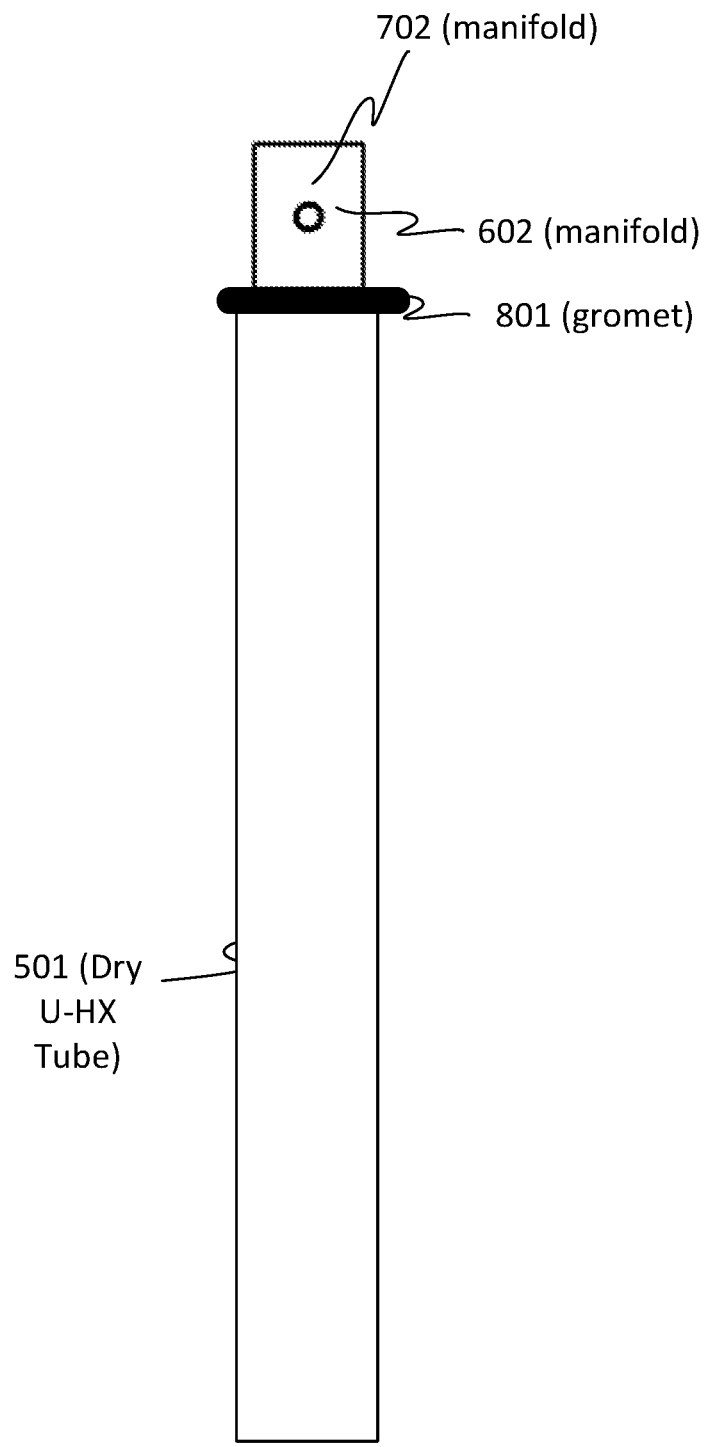
FIG. 8 is a side view of an embodiment of the Dry Solar Thermal Hot Water Heating Vacuum/Geometric Tube System.
Figure 9:
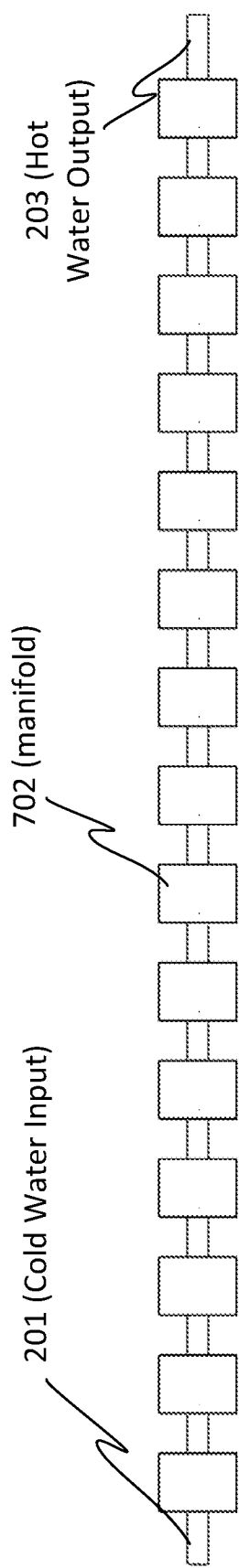
FIG. 9 is a top view of an embodiments of the Dry Solar Thermal Hot Water Heating Vacuum/Geometric Tube System.
Figure 10:
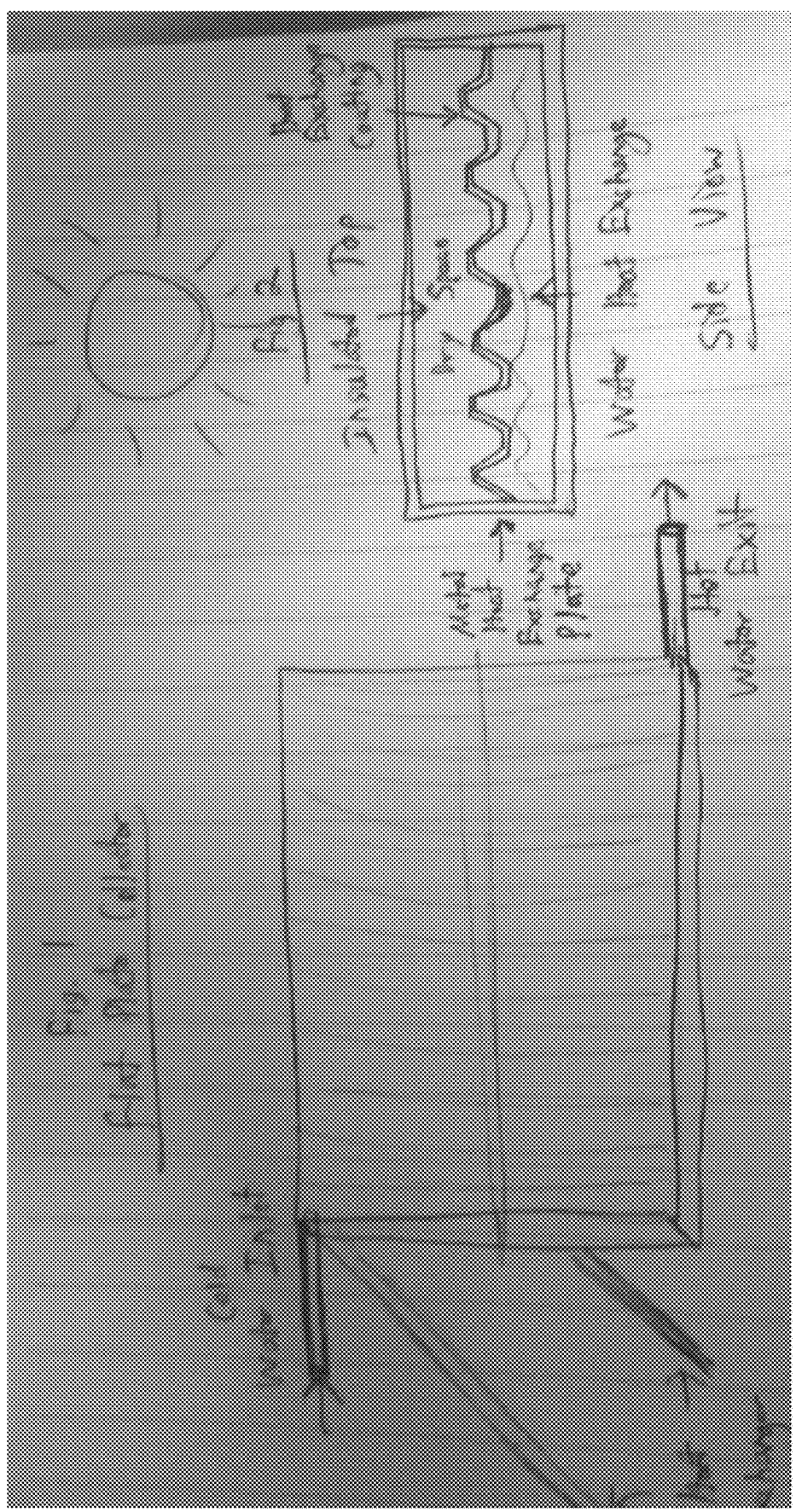
Figure 11:
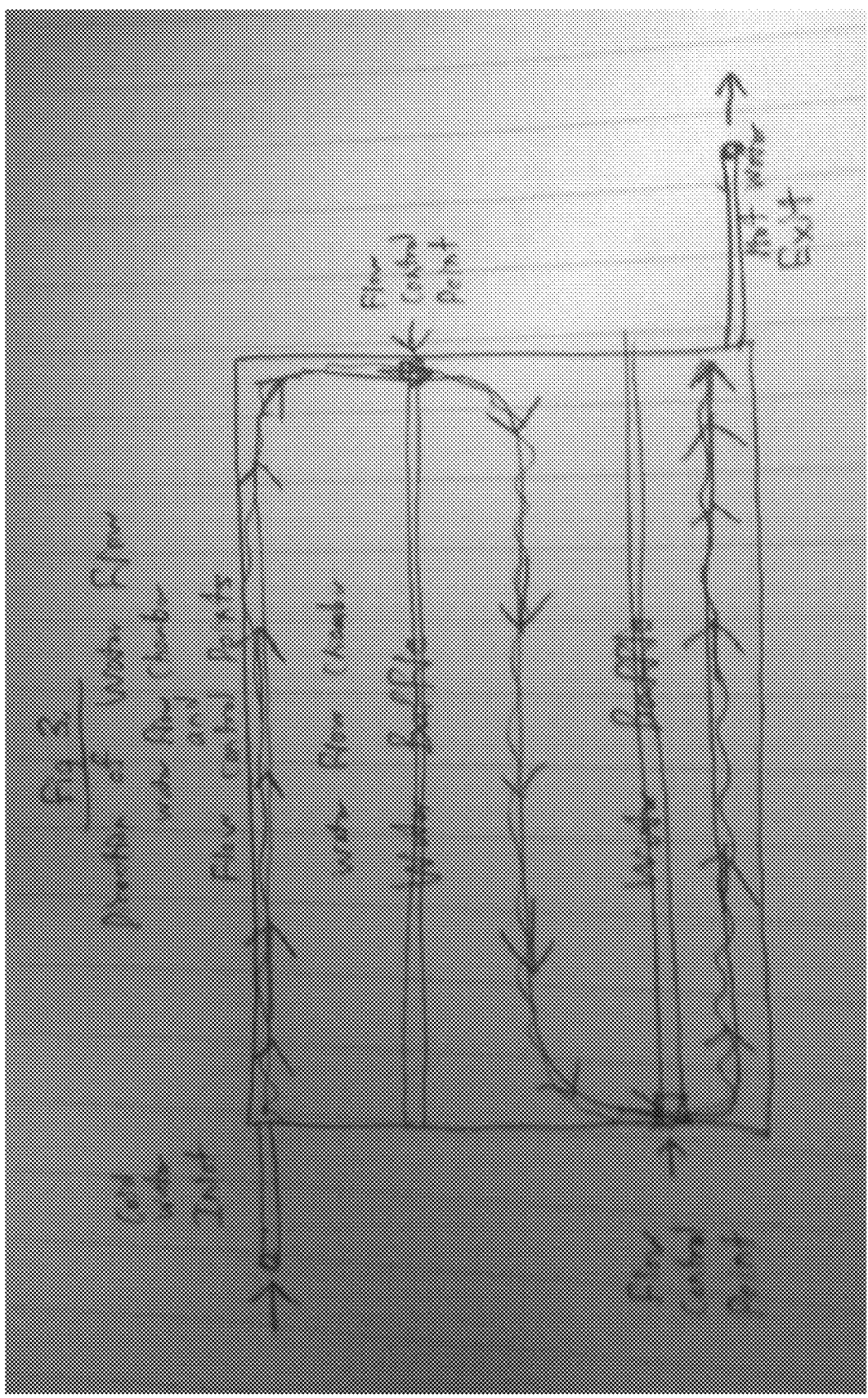
Figure 12:
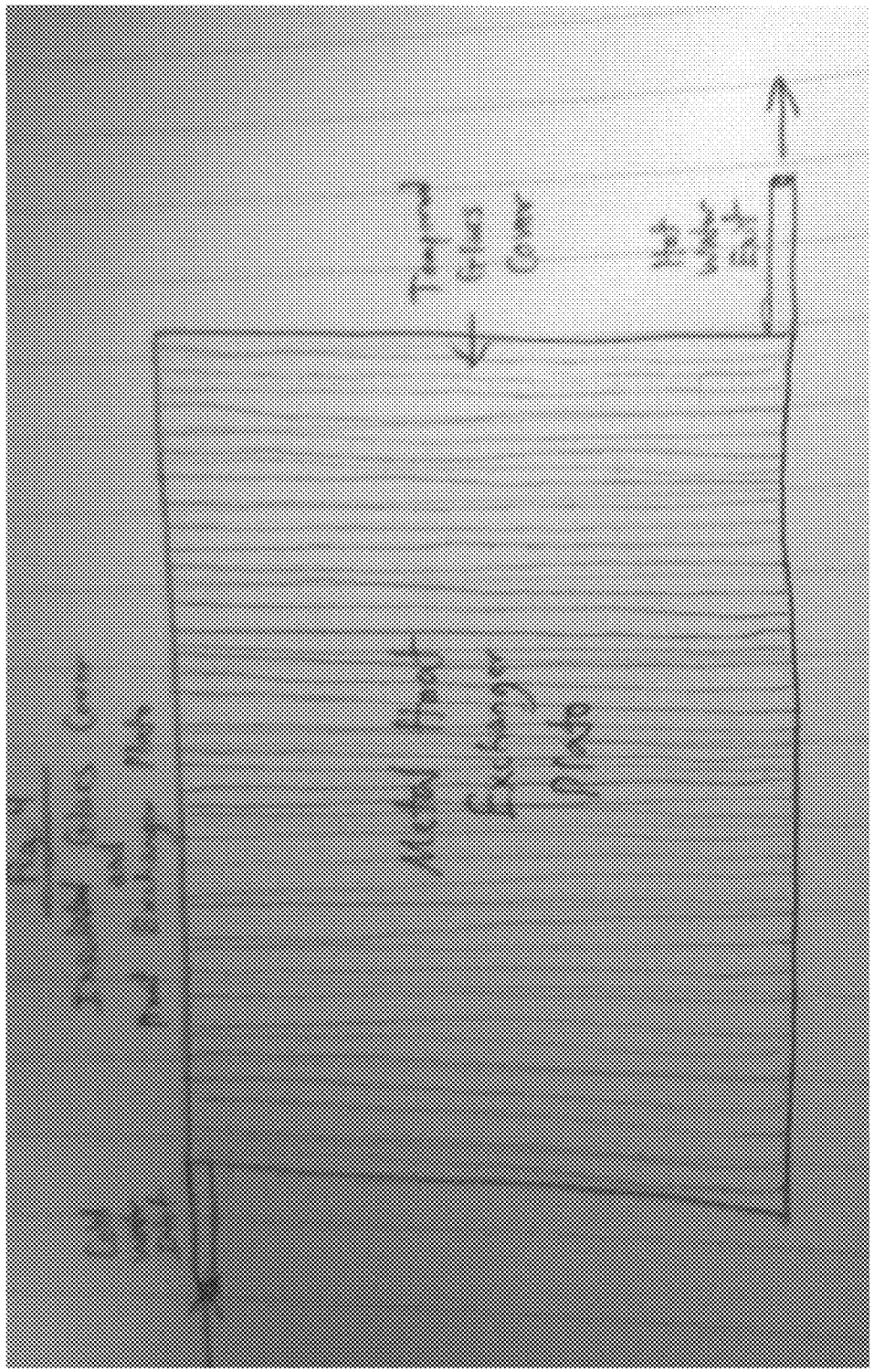

The dry tube vacuum system is comprised of a cold header 201, hot header 203, a manifold 702, a plurality of dry heat exchange tubes 601, and a plurality of vacuum tubes 204. The plurality of vacuum tubes are represented by a single vacuum to in FIG. 7 for clarity. The dry tube vacuum system uses an internal manifold with either ethylene glycol, alcohol or other substance to provide the heat transfer within the system. In the dry design, water is circulated through the collector manifold only where the top of the tubes connect. This embodiment comprises a collector manifold that increases heat transfer across the unit. There is an increase in heat transfer output based upon the surface area and orientation of the rods. The flat plate collector uses a geometrically designed internal heat fins system to maximize absorption of solar energy to maximize heat transfer to water flowing inside the flat plates.

In both the wet vacuum to and dry vacuum to systems, the vacuum tubes are sealed to the manifold (either 202 or 702) with a grommet 801 which seals the vacuum in the inside of the vacuum tube 204.

One embodiment comprises a double helical copper tube design inside of the vacuum rods as a means of maximizing the heat transfer within the glass vacuum rods. Another embodiment comprises a more effective upper manifold system that ties into the helical tube design. The upper manifold implements parallel or cross flow across the top of the vacuum tubes to further increase heat transfer in the system. Water is circulated though the helical tubes at set intervals by a programmable pump to provide heat transfer for the unit. The concept is the same in the flat plate collector, with water actively circulated through the heat fins within the collector to heat water. The cycle period uses the ambient temperature and sunlight conditions to establish the most effective programming and temperature cycling within the system. An insulated hot water tank is then used to store the hot water that is being generated by the heat exchanger.

Another embodiment comprises a solar photovoltaic (electric) panel 114 to create a standalone hot water heating unit. The additional solar photovoltaic (electric) panel 114 generates electricity that power a pump to circulate water through the heat exchanger. These embodiments target the underlying efficiency concerns with solar energy devices.

In a best mode the solar collector that we have implemented includes a vacuum insulated, parallel transparent glass tubes/flat plate heat fin system. Sunlight enters the tube, strikes the internal absorber and heats a liquid flowing through the tubes/heat fin system. There are two fundamental designs that we created. The three designs include the wet and dry tube helical copper tube variations and a flat plate collector system. The wet system directly uses the circulating water through the system as a means for heat transfer. Water is circuited several times through both the tubes and collector manifold at the top of the tubes. After the water is heated it is then stored in the insulated tank. The dry tube system uses an internal manifold with either ethylene glycol, alcohol or other substance to provide the heat transfer. In the dry design, water is circulated through the collector manifold only where the top of the tubes connect. The concept is the same in the flat plate collector, with water actively circulated through the heat fins within the collector to heat water. Our design implements a collector manifold that increases heat transfer across the unit as well. There is an increase in heat transfer output based upon the surface area and orientation of the rods. We created the double helical copper tube design inside of the vacuum rods as a means of maximizing the surface area within the glass vacuum rods. We have designed a more effective upper manifold system that ties into the helical tube design as well. The upper manifold implements parallel or cross flow across the top of the vacuum tubes to further increase heat transfer in the system. Water is circulated though the helical tubes at set intervals by a programmable pump to provide heat transfer for the unit. We analyzed the cycle period based upon ambient temperature and sunlight conditions to establish the most effective temperature cycling in the system. An insulated hot water tank is then used to store the hot water that is being generated by the heat exchanger. There is the option of a solar photovoltaic (electric) panel 114 to create a standalone hot water heating unit. The additional solar photovoltaic (electric) panel 114 generates electricity that power a pump to circulate water through the heat exchanger. Our invention targets the underlying efficiency concerns with solar energy devices. Please see the attached drawings for further description of the solar heat exchanger and its components.

What is claimed is:

1. A solar thermal hot water heating system comprising
a solar energy collector,
a controller,
a working fluid recirculation pump,
an expansion tank,
a vent,
a relief valve,
a hot header,
an upper manifold at the top of the tubes wherein the upper manifold forces parallel or cross flow of water across the top of the vacuum tubes to further increase heat transfer in the system,
a double helical copper tubes inside of glass vacuum rods to maximize heat transfer within the glass vacuum rods, wherein the fluid is directed to alternating copper helical tubes,
a heat exchanger, wherein water from a water heater is circulated via a pump through the heat exchanger and then returns to the water heater, and
a plurality of temperature sensors.

2. The solar thermal hot water heating system of claim 1 wherein the solar energy collector comprises geometrically designed pipes mounted within a vacuum insulated and parallel transparent glass tubes.

3. The solar thermal hot water heating system of claim 2 wherein the solar energy collector is comprised of a wet vacuum heat transfer tube.

* * * * *